United States Patent
Hyun et al.

(10) Patent No.: US 11,194,894 B2
(45) Date of Patent: Dec. 7, 2021

(54) ELECTRONIC DEVICE AND CONTROL METHOD THEREOF

(71) Applicant: SAMSUNG ELECTRONICS CO., LTD., Suwon-si (KR)

(72) Inventors: Seungyeol Hyun, Suwon-si (KR); Inki Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/281,656

(22) Filed: Feb. 21, 2019

(65) Prior Publication Data
US 2019/0258788 A1 Aug. 22, 2019

(30) Foreign Application Priority Data
Feb. 21, 2018 (KR) .................. 10-2018-0020630

(51) Int. Cl.
| | |
|---|---|
| G06K 9/00 | (2006.01) |
| G06F 21/32 | (2013.01) |
| G06F 21/34 | (2013.01) |
| G06F 3/01 | (2006.01) |
| G06K 9/32 | (2006.01) |

(52) U.S. Cl.
CPC ............ *G06F 21/32* (2013.01); *G06F 3/013* (2013.01); *G06F 21/34* (2013.01); *G06K 9/0061* (2013.01); *G06K 9/00281* (2013.01); *G06K 9/00604* (2013.01); *G06K 9/00617* (2013.01); *G06K 9/00885* (2013.01); *G06K 9/3208* (2013.01)

(58) Field of Classification Search
None
See application file for complete search history.

(56) References Cited

U.S. PATENT DOCUMENTS

| | | | |
|---|---|---|---|
| 10,007,328 B2 | 6/2018 | Lee et al. | |
| 2007/0036397 A1* | 2/2007 | Hamza | G06K 9/00597 |
| | | | 382/117 |
| 2010/0110374 A1 | 5/2010 | Raguin et al. | |
| 2014/0043231 A1 | 2/2014 | Yoshioka | |
| 2014/0347282 A1 | 11/2014 | Woo | |
| 2015/0098630 A1* | 4/2015 | Perna | G07C 9/00563 |
| | | | 382/117 |
| 2015/0261996 A1* | 9/2015 | Kim | G06K 9/00255 |
| | | | 348/14.03 |
| 2015/0334567 A1 | 11/2015 | Chen et al. | |

(Continued)

FOREIGN PATENT DOCUMENTS

| | | |
|---|---|---|
| JP | 2004-133637 A | 4/2004 |
| JP | WO2012144526 A1 | 10/2012 |

(Continued)

OTHER PUBLICATIONS

International Search Report (PCT/ISA/210) dated Jun. 10, 2019 issued by the International Searching Authority in International Application No. PCT/KR2019/002100.

(Continued)

*Primary Examiner* — Wei Wen Yang
(74) *Attorney, Agent, or Firm* — Sughrue Mion, PLLC

(57) ABSTRACT

An electronic apparatus for authenticating a user thereof based on a face angle, a rotational angle of the electronic apparatus, a difference value between the face angle and the rotational angle and a modified face image.

14 Claims, 15 Drawing Sheets

(56) References Cited

U.S. PATENT DOCUMENTS

| | | | |
|---|---|---|---|
| 2017/0118405 A1 | 4/2017 | Song | |
| 2017/0154610 A1 | 6/2017 | Zhang et al. | |
| 2017/0193295 A1 | 7/2017 | Kim et al. | |
| 2017/0256073 A1* | 9/2017 | Borenstein | G06T 7/73 |
| 2018/0144192 A1* | 5/2018 | Kim | H04N 5/23222 |

FOREIGN PATENT DOCUMENTS

| | | |
|---|---|---|
| KR | 2003-0051963 A | 6/2003 |
| KR | 10-1202448 B1 | 11/2012 |
| KR | 10-2013-0006154 A | 1/2013 |
| KR | 10-2016-0050682 A | 5/2016 |
| KR | 10-2017-0028941 A | 3/2017 |
| KR | 10-2017-0046413 A | 5/2017 |

OTHER PUBLICATIONS

Written Opinion (PCT/ISA/237) dated Jun. 10, 2019 issued by the International Searching Authority in International Application No. PCT/KR2019/002100.

Communication dated Oct. 2, 2020, from the European Patent Office in counterpart European Application No. 19757999.8.

Communication dated Jun. 23, 2021 issued by the European Intellectual Property Office in counterpart European Application No. 19 757 999.8.

* cited by examiner (a)  (b)

(a)　　　　　　　　　　　　(b)

(a)  (b)

(a)          (b)

ELECTRONIC DEVICE AND CONTROL METHOD THEREOF

CROSS-REFERENCE TO RELATED APPLICATIONS

This application claims priority from Korean Patent Application No. 10-2018-0020630, filed on Feb. 21, 2018, in the Korean Intellectual Property Office, the disclosure of which is incorporated herein by reference in its entirety.

BACKGROUND

1. Field

Devices and methods consistent with the disclosure relate to an electronic apparatus and a controlling method thereof, and more particularly, to an electronic apparatus for performing iris recognition and a controlling method thereof.

2. Description of the Related Art

As various personal information and contents information are stored in an electronic apparatuses such as smartphones, table PCs, etc., there is an increasing demand for security of an electronic apparatuses.

A password input method has been used to secure electronic apparatuses, but recently, various biometric authentication methods such as fingerprint recognition, speech recognition, and iris recognition have been introduced.

In the case of iris recognition, an electronic apparatus captures a user's face including user's eyes through a camera in the electronic apparatus, and extracts iris images respectively corresponding to a left eye and a right eye from the captured face image.

The electronic apparatus moves the extracted iris images respectively corresponding the left eye and the right eye within a pre-defined angle, and identifies whether the iris images match the pre-registered iris images.

This iris recognition method moves the pre-extracted iris images respectively corresponding to the left eye and the right eye within a pre-defined angle as described above.

Therefore, if a user face is captured at a pre-determined angle or more, an electronic apparatus may not recognize a user's iris through the above-described iris recognition method.

SUMMARY

An aspect of the disclosure relates to improving iris recognition of an electronic apparatus.

According to an embodiment, there is provided a method of authenticating a user of an electronic apparatus including capturing a face image of a user, obtaining a tilted angle by analyzing the captured face image, obtaining a rotational angle of the electronic apparatus, obtaining a modified face image of the captured face image based on a difference between the tilted angle and the rotational angle, and authenticating the user based on the modified face image.

The obtaining of the tilted angle may include obtaining the tilted angle depending on a degree of tilt between center points of iris images respectively corresponding to a left eye and a right eye in the captured face image.

The obtaining of the tilted angle may include obtaining feature points of a face by analyzing the captured face image, and obtaining the tilted angle depending on a degree of tilt of a polygon acquired from the obtained feature points.

The obtaining of the rotational angle of the electronic apparatus may include obtaining the rotational angle of the electronic apparatus by using a sensing value acquired through at least one of an acceleration sensor, a geomagnetic sensor and a gyro sensor included in the electronic apparatus.

The obtaining the modified face image may include obtaining an iris code from the captured face image, and shifting the obtained iris code based on the difference value between the tilted angle and the rotational angle, wherein the authenticating comprises comparing the shifted iris code with a pre-registered iris code and authenticating the user.

The authenticating may include, based on the difference value between the tilted angle and the rotational angle exceeding a pre-determined threshold value, shifting one of iris codes respectively corresponding to a left eye and a right eye in the captured face image, and authenticating the user by using the shifted iris code and the pre-registered iris code.

The method may further include identifying an output mode of a display screen based on at least one of the tilted angle and the rotational angle in accordance with an operation mode set by the user based on the user being authenticated.

The identifying may include based on the operation mode being a mode for identifying an output mode of the display screen based on the tilted angle and the rotational angle, and the difference value between the tilted angle and the rotational angle being smaller than a pre-determined threshold value, identifying an output mode of the display screen as a first output mode, and based on the rotational angle exceeding a pre-determined threshold angle, and the difference value between the tilted angle and the rotational angle being equal to or greater than the pre-determined threshold value, identifying an output mode of the display screen as a second output mode.

The identifying may further include based on the operation mode being a mode for identifying an output mode of the display screen based on the tilted angle and the rotational angle, and the difference value between the tilted angle and the rotational angle being smaller than a pre-determined threshold value, identifying an output mode of the display screen as a first output mode, and based on the rotational angle being equal to or smaller than a pre-determined threshold angle, and the difference value between the tilted angle and the rotational angle being equal to or greater than the pre-determined threshold value, identifying an output mode of the display screen as a second output mode.

The identifying may further include based on the operation mode being a mode for identifying an output mode of the display screen based on the rotational angle, and the rotational angle being equal to or smaller than a pre-determined threshold angle, identifying an output mode of the display screen as a first output mode, and based on the rotational angle exceeding the pre-determined threshold angle, identifying an output mode of the display screen as a second output mode.

According to an embodiment, there is provided an electronic apparatus including a camera, a sensor configured to detect a motion of the electronic apparatus, and a processor configured to obtain a tilted angle of a face of a user of the electronic apparatus based on analysis of a face image of a user captured by the camera, obtain a rotational angle of the electronic apparatus based on information detected by the sensor, obtain a modified face image of the face image based on a difference value between the tilted angle and the rotational angle, and authenticate the user based on the modified face image.

The processor may obtain the tilted angle depending on a degree of tilt between center points of iris images respectively corresponding to a left eye and a right eye in the captured face image.

The processor may obtain feature points of a face by analyzing the captured face image, and obtain the tilted angle depending on a degree of tilt of a polygon acquired from the obtained feature points.

The sensor may include at least one of an acceleration sensor, a geomagnetic sensor, and a gyro sensor, and wherein the processor obtains the rotational angle of the electronic apparatus by using a sensing value acquired through at least one of an acceleration sensor, a geomagnetic sensor and a gyro sensor.

The processor may be further configured to obtain an iris code from the captured face image, shift the obtained iris code based on the difference value between the tilted angle and the rotational angle, compare the shifted iris code with a pre-registered iris code, and authenticate the user.

The processor may be further configured to, based on the difference value between the tilted angle and the rotational angle exceeding a pre-determined threshold value, shift one of iris codes respectively corresponding to a left eye and a right eye in the captured face image, and authenticate the user by using the shifted iris code and the pre-registered iris code.

The electronic apparatus may further include a display, wherein the processor is further configured to, based on the user being authenticated, identify an output mode of the display based on at least one of the tilted angle and the rotational angle depending on an operation mode set by the user.

The processor may be further configured to, based on the operation mode being a mode for identifying an output mode of the display based on the tilted angle and the rotational angle, and the difference value between the tilted angle and the rotational angle being smaller than a pre-determined threshold value, identify an output mode of the display as a first output mode, and based on the rotational angle exceeding a pre-determined threshold angle, and the difference value between the tilted angle and the rotational angle being equal to or greater than the pre-determined threshold value, identify an output mode of the display as a second output mode.

The processor may be further configured to, based on the operation mode being a mode for identifying an output mode of the display based on the tilted angle and the rotational angle, and the difference value between the tilted angle and the rotational angle being smaller than a pre-determined threshold value, identify an output mode of the display as a first output mode, and based on the rotational angle being equal to or smaller than a pre-determined threshold angle, and the difference value between the tilted angle and the rotational angle being equal to or greater than the pre-determined threshold value, identify an output mode of the display as a second output mode.

The processor may be further configured to, based on the operation mode being a mode for identifying an output mode of the display based on the rotational angle, and the rotational angle being equal to or smaller than a pre-determined threshold angle, identify an output mode of the display as a first output mode, and based on the rotational angle exceeding the pre-determined threshold angle, identify an output mode of the display as a second output mode.

According to the above-described various embodiments, an electronic apparatus may perform user iris recognition through the captured user face image although a user face is captured in various forms.

DETAILED DESCRIPTION OF EMBODIMENTS

Figure 1:
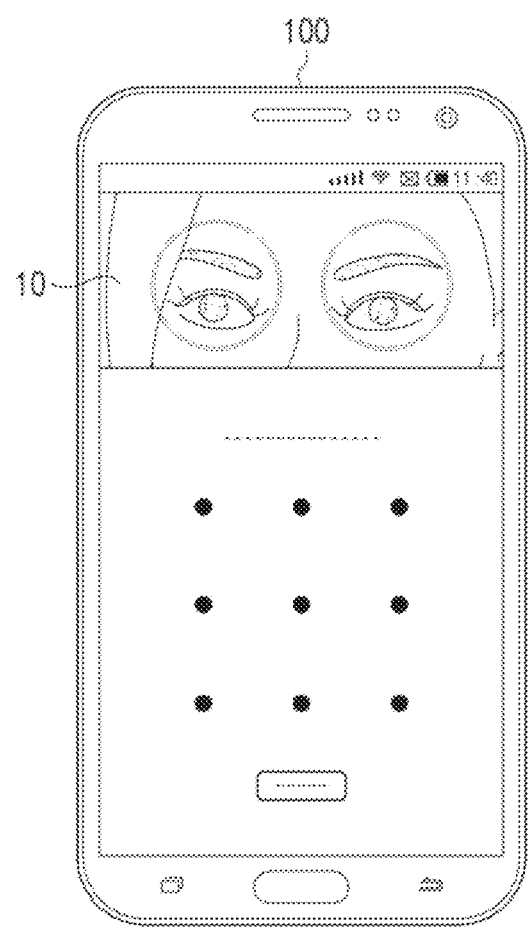
FIG. 1 is an exemplary view illustrating an example of authentication of a user in an electronic apparatus according to an embodiment of the disclosure.

The terms used in this specification will be briefly described, and the disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, descriptions of known elements may be omitted.

The terms such as "first," "second," and so on may be used to describe a variety of elements, but the elements should not be limited by these terms. The terms are used simply to distinguish one element from another element.

The singular expression also includes the plural meaning unless clear from context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element is referred to as being "connected" or "coupled" to another element, the element may be directly connected or coupled to the another element or may be indirectly connected or coupled to the another element with one or more intervening elements interposed therebetween. In addition, when an element is referred to as "including" a component, this indicates that the element may further include another component instead of excluding another component unless otherwise indicated.

Hereinafter, embodiments of the disclosure will be described in detail with reference to the accompanying drawings so that those skilled in the art can easily implement the techniques therein. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

Hereinafter, the disclosure will be describe in greater detailed with reference to drawings.

FIG. 1 is an exemplary view illustrating an example of authentication of a user in an electronic apparatus according to an embodiment of the disclosure.

Referring to FIG. 1, an electronic apparatus 100 may be a user terminal device such as a smartphone, a tablet, etc. The electronic apparatus 100 may perform user authentication for use and/or access of the electronic apparatus 100 and/or an application thereof through at least one of patterns, fingerprints, voices, irises set by a user.

In the case of user authentication through iris recognition, the electronic apparatus 100 may capture a user face in a lock screen state. The electronic apparatus 100 may detect an iris image from a captured user face image 10. The electronic apparatus 100 may identify whether the detected iris image coincides with a pre-stored iris image, and when the two iris images match each other, determine that a user is authorized to access the electronic apparatus 100. After the user is authorized to access the electronic apparatus 100, the electronic apparatus 100 may unlock the screen and switch the screen to a display screen, a menu screen, or a main screen for displaying a content.

According to the embodiment as below, the electronic apparatus 100 may identify whether the user iris image matches the pre-stored iris image.

When the iris images respectively corresponding to the left eye and the right eye are detected from the captured user face image 10, the electronic apparatus 100 may obtain a tilted angle of a face of the user based on the detected iris images.

According to an embodiment, the electronic apparatus 100 may obtain a tilted (or slanted) angle according to the degree of tilt between center points of the iris images respectively corresponding to the left eye and the right eye.

The electronic apparatus 100 my identify the degree of tilt by using a reference line extended based on a center point of one of the iris images respectively corresponding to the left eye and the right eye, and a connection line connecting center points of the iris images respectively corresponding to the left eye and the right eye, and obtain a tilted angle of the captured user face image 10 based on the identified tilt.

The electronic apparatus 100 may obtain a rotational angle of the electronic apparatus 100 by using a sensing value obtained through at least one of an acceleration sensor, a geomagnetic sensor and a gyro sensor included in the electronic apparatus 100.

The electronic apparatus 100 may obtain a difference value between the obtained tilted angle and the rotational angle of the electronic apparatus 100 and modify the iris images respectively corresponding to the left eye and the right eye based on the calculated difference value.

When the difference value between the obtained tilted angle and the rotational angle of the electronic apparatus 100 is calculated, the electronic apparatus 100 may shift the iris images respectively corresponding to the left eye and the right eye to one side by the calculated difference value.

The electronic apparatus 100 may compare the shifted iris image with the pre-stored iris image and identify whether the two iris images match each other. As a result of identification, if the two iris images match each other, the electronic apparatus 100 may determine that a user is authorized to use the electronic apparatus 100, and unlock the screen of the electronic apparatus 100.

As described above, the operation of performing user authentication through user iris recognition in the electronic apparatus 100 according to an embodiment of the disclosure has been briefly described. Hereinafter, constituent elements of the electronic apparatus 100 for performing user authentication through iris recognition will be described.

Figure 2:
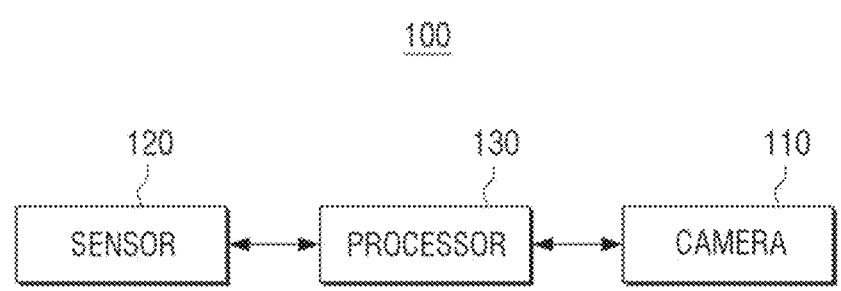
FIG. 2 is a schematic block diagram illustrating an electronic apparatus according to an embodiment of the disclosure.

FIG. 2 is a schematic block diagram illustrating an electronic apparatus according to an embodiment of the disclosure.

Referring to FIG. 2, an electronic apparatus 100 may include a camera 110, a sensor 120, and a processor 130.

The camera 110 may capture an image. The camera 110 may be disposed in the upper portion of the front surface to capture a user. However, the disclosure is not limited thereto. The camera 110 may include a plurality of cameras, and one of the plurality of cameras 110 may be disposed in the upper end of the front surface, and the other one may be disposed on the rear surface of the electronic apparatus 100.

The camera 110 may include an infrared ray transmission filter in the form of a mirror, which may be a cold mirror.

Figure 3:
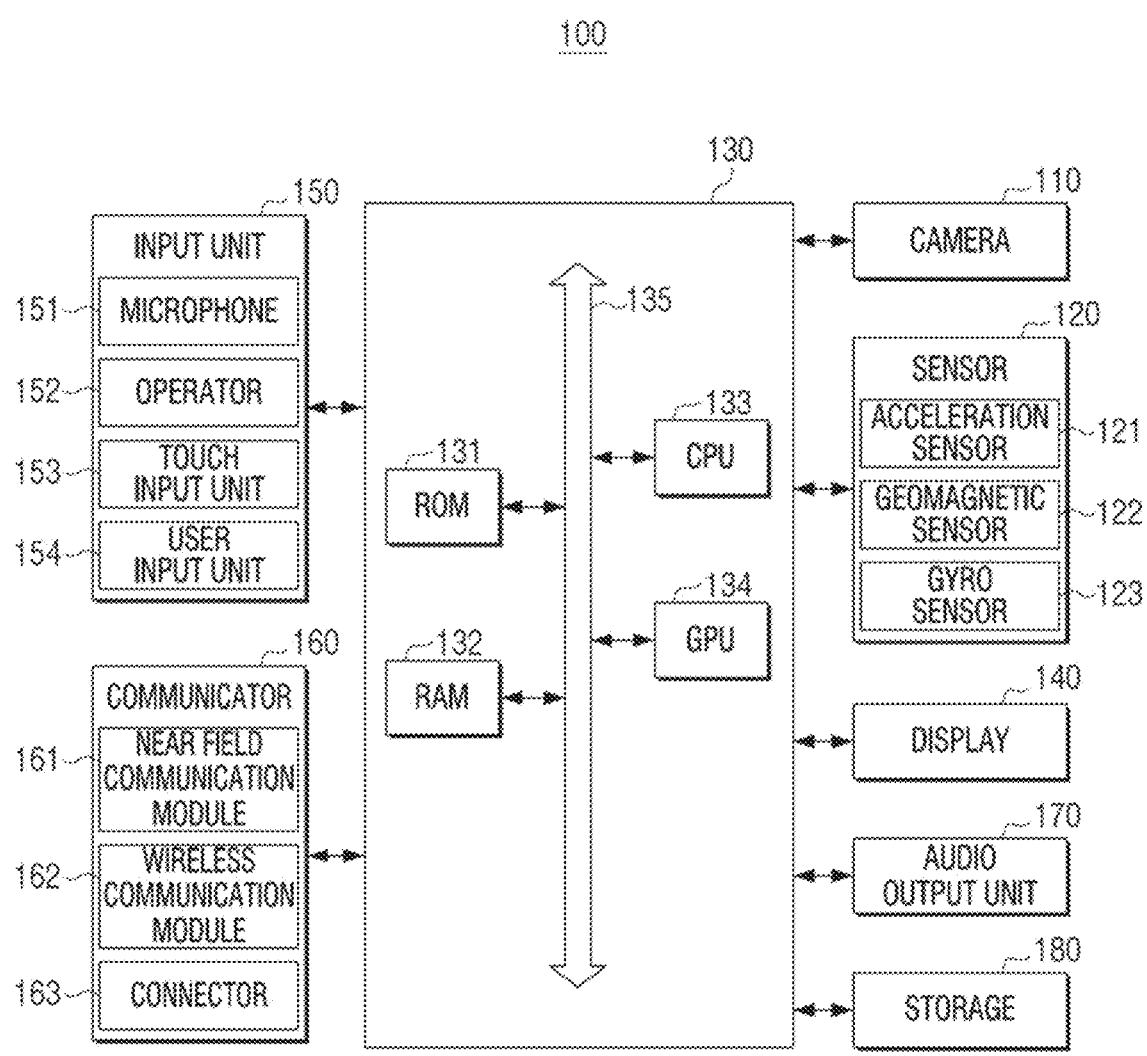
FIG. 3 is a detailed block diagram illustrating an electronic apparatus according to an embodiment of the disclosure.

The sensor 120 may detect the motion of the electronic apparatus 100. Referring to FIG. 3, the sensor 120 may include an acceleration sensor 121, a geomagnetic sensor 122, and a gyro sensor 123, and may detect the motion of the electronic apparatus 100 by using at least one of the acceleration sensor 121, the geomagnetic sensor 122, and the gyro sensor 123.

The acceleration sensor 121, the geomagnetic sensor 122, and the gyro sensor 123 will be described below.

The processor 130 may obtain a tilted angle by analyzing a user face image captured by the camera 110.

The processor 130 may obtain a rotational angle of the electronic apparatus 100 based on the information detected by the sensor 120. As described above, the processor 130 may obtain the rotational angle of the electronic apparatus 100 by using a value detected by at least one of the acceleration sensor 121, the geomagnetic sensor 122, and the gyro sensor 123.

The processor 130 may modify the face image captured based on the difference value between the obtained tilted angle and the rotational angle, and perform user authentication based on the modified face image.

The processor 130 may obtain the tilted angle from the captured user face image based on the embodiment as below.

According to an embodiment, the processor 130 may obtain a tilted angle depending to the degree of tilt between the center points of the iris images respectively corresponding to the left eye and the right eye in the captured face image.

The processor 130 may obtain the iris images respectively corresponding to the left eye and the right eye from the captured face image. The processor 130 may detect the iris areas from the iris images respectively corresponding to the left eye and the right eye, and identify the center points from the detected iris areas.

The processor 130 may use a extension line 730 horizontally extended from the center point of the iris area of one of the left eye and the right eye and a connection line connecting the center points of the iris areas respectively corresponding to the left eye and the right eye and obtain an angle between the extension line and the connection line as a user tilted angle.

According to another embodiment, the processor 130 may obtain feature points of a face by analyzing the captured face image. The processor 130 may obtain a tilted angle depending on the degree of tilt of a polygon obtained from the feature points.

The processor 130 may obtain the feature points of the face by analyzing a captured face image 810. The feature points of the face may be center points of the iris areas respectively corresponding to the left eye and the right eye and a center point of a lower lip.

When the feature points of the face are obtained, the processor 130 may obtain a polygon in an inverted triangle shape connecting the feature points. The processor 130 may obtain an angle between a reference line in a vertical direction based on the center point of the polygon and an extension line connecting the center point of the polygon and the center point of the lower lip as a tilted angle.

When the user tilted angle is obtained through the embodiment, the processor 130 may modify an image captured based on the difference value between the obtained user tilted angle and the rotational angle of the electronic apparatus 100, and perform user authentication based on the modified face image.

The processor 130 may obtain the iris codes from the captured face image. The processor 130 may shift the iris codes obtained from the face image based on the difference value between the obtained tilted angle and the rotational angle of the electronic apparatus 100. The processor 130 may compare the pre-registered iris code with the shifted iris code and authenticate a user.

The pre-registered iris code may be stored in the storage 180.

The processor 130 may determine whether the difference value between the tilted angle and the rotational angle exceeds a pre-set threshold value before shifting the iris codes obtained from the face image based on the difference value between the obtained tilted angle and the rotational angle of the electronic apparatus 100.

When the difference value between the tilted angle and the rotational angle is within a pre-determined threshold value, as described above, the processor 130 may shift the iris codes respectively corresponding to the left eye and the right eye obtained from the face image based on the difference value between the tilted angle and the rotational angle. The processor 130 may compare the iris codes respectively corresponding to the left eye and the right eye pre-stored in the storage 180 with the shifted iris codes respectively corresponding to the left eye and the right eye.

As a result of comparison, when the pre-stored iris codes match the shifted iris codes, the processor 130 may determine that the user detected by the electronic apparatus 100 is a correct user, and release a lock screen.

When the difference value between the tilted angle and the rotational angle exceeds a pre-determined threshold value, the processor 130 may select one of the iris codes respectively corresponding to the left eye and the right eye included in the captured face image, shift the selected iris code based on the difference value between the tilted angle and the rotational angle, and perform user authentication by using the shifted iris codes and the pre-stored iris codes.

For example, the processor 130 may select the iris code corresponding to the left eye between the iris codes respectively corresponding to the left eye and the right eye included in the face image. When the iris codes of the left eye is selected, the processor 130 may shift the selected iris code by the difference value between the tilted angle and the rotational angle. The processor 130 may compare the shifted iris code of the left eye with the pre-stored iris code of the left eye and when the two iris codes match each other, determine that the captured user is an authenticated user, and release a lock screen.

According to a further aspect of the disclosure, the processor 130 may control the camera 110 to capture one of the left eye of the right eye, which is near to the camera 110, according to the motion of the electronic apparatus 100 detected by the sensor 120 before capturing the user face image through the camera 110.

The processor 130 may obtain the rotational angle of the electronic apparatus 100 based on the sensing value sensed by the sensor 120. The processor 130 may identify whether the obtained rotational angle of the electronic apparatus 100 exceeds a pre-determined threshold angle.

As a result of identification, when the rotational angle of the electronic apparatus 100 is equal to or smaller than a predetermined threshold angle, the processor 130 may control the camera 110 to capture a user's face. Accordingly, the camera 100 may capture a face of a user. The processor 130 may obtain the tilted angle and the iris codes from the iris images respectively corresponding to the left eye and the right eye in the captured user face image.

The processor 130 may shift the iris codes respectively corresponding to the left eye and the right eye based on the difference value between the obtained tilted angle and the rotational angle of the electronic apparatus 100, and compare the shifted iris codes respectively corresponding to the left eye and the right eye with the pre-stored iris codes respectively corresponding to the left eye and the right eye to perform user authentication.

When the rotational angle of the electronic apparatus 100 exceeds a pre-determined threshold angle, the processor 130 may control the camera 110 to capture one of the left eye and the right eye, which is close to the camera 110.

For example, the user's right eye may be closer to the camera 110 than the user's left eye. In this case, the camera 110 may capture an image including the right eye, and the processor 130 may rotate the captured image by a rotational angle of the electronic apparatus 100. The processor 130 may detect an iris area of the right eye from the rotated image and obtain an iris code from the detected iris area. The processor 130 may compare the obtained iris code of the right eye with the pre-stored iris code of the right eye, and identify whether the two iris codes match each other to perform user authentication.

Upon the completion of user authentication through the above-described embodiment, the processor 130 may identify an output mode of the display 140 based on one of the tilted angle and the rotational angle according to an operation mode set by a user.

According to an embodiment, if an operation mode is a mode for identifying an output mode of the display 140 based on the tilted angle and the rotational angle of the electronic apparatus 100, the processor 130 may compare the difference value between the tilted angle and the rotational angle with the pre-determined threshold value.

As a result of comparison, when the difference value between the tilted angle and the rotational angle is smaller than the pre-determined threshold value, the processor 130 may identify the output mode of the display 140 as a first output mode.

When the rotational angle of the electronic apparatus 100 exceeds the pre-determined threshold angle, and the difference value between the tilted angle and the rotational angle of the electronic apparatus 100 is equal to or greater than the pre-determined threshold value, the processor 130 may identify the output mode of the display 140 as a second output mode.

When the rotational angle of the electronic apparatus 100 is equal to or smaller than the pre-determined threshold angle, and the difference value between the tilted angle and the rotational angle of the electronic apparatus 100 is equal to or greater than the pre-determined threshold value, the processor 130 may identify the output mode of the display 140 as the second output mode.

When the operation mode is a mode for identifying the output mode of the display 140 based on the rotational angle of the electronic apparatus 100, the processor 130 may compare the rotational angle of the electronic apparatus 100 with the pre-determined threshold angle. As a result of comparison, when the rotational angle of the electronic apparatus 100 is equal to or smaller than the pre-determined threshold angle, the processor 130 may identify the output mode of the display 140 as the first output mode.

When the rotational angle of the electronic apparatus 100 exceeds the pre-determined threshold angle, the processor 130 may identify the output mode of the display 140 as the second output mode.

The electronic apparatus 100 may include a display 140, an input unit 150, a communicator 160, an audio output unit 170, and a storage 180 as shown in FIG. 3 in addition to the camera 110, the sensor 120 and the processor 130 as described above.

The acceleration sensor 121, the geomagnetic sensor 122, and the gyro sensor 123 included in the sensor 120 will be described before describing the additional constituent elements.

The acceleration sensor 121 may be a sensor for measuring acceleration or intensity of impact of a moving electronic apparatus 100, and necessarily used in control systems for various transportation means such as automobiles, trains, and airplanes, and the like and robots, including electronic apparatuses such as smart phones, tablet PCs, etc.

The geomagnetic sensor 122 may be an electronic compass that can detect an azimuth using a geomagnetic field. The geomagnetic sensor 122 may be used for location tracking, 3D video games, etc., or may be used for a smart phone, a radar, a GPS, a PDA, a navigation device, etc.

The gyroscope sensor 123 may be a sensor that identifies the 6-axis direction by adding rotations to the acceleration sensor to recognize a more detailed and precise operation.

In addition, the sensor 120 may further include a gravity sensor for detecting a direction in which gravity upon the electronic apparatus 100, a proximity sensor for determining proximity of objects, and an infrared sensor as described above.

The display 140 may display contents, an execution screen including icons respectively executing a plurality of applications stored in the storage 180 of the electronic apparatus 100, or various UI screens for controlling an operation of the electronic apparatus 100.

The display 140 may display a lock screen for receiving biometric information such as user's irises, fingerprints, etc. or a pattern set by a user before displaying the execution screen.

The display unit 140 may be a liquid crystal display (LCD), an organic light emitting diode (OLED), or the like.

The display 140 may be embodied as a touch screen type forming a mutual layer structure with a touch input unit 153 for receiving a user touch command to be described as below.

The input unit 150 may be an input means to receive various user commands and transmit the user commands to the processor 130. The input unit 150 may include a microphone 151, an operator 152, a touch input unit 153, and a user input unit 154.

The microphone 151 may receive user voice commands, and the operator 152 may be embodied as a key pad including various functional keys, numeric keys, special keys, character key, etc.

When the display 140 is embodied as a touch screen type, the touch input 153 may be embodied as a touch pad having a mutual layer structure with the display 130. The touch input 153 may receive a selection command for icons related to various applications displayed through the display 130.

The user input unit 154 may receive IR signals or RF signals for controlling the operation of the user terminal 100 from at least one peripheral device such as a remote control device.

The communicator 160 may perform data communication with peripheral devices such as a smart TV, a smart phone, and a tablet PC, and a relay terminal device for transmitting and receiving data to and from a content server.

The communicator 160 may include a connector 163 including at least one of a wireless communication module 162 such as a near field communication module 161, and a wireless LAN module, and a wired communication module such as a high-definition multimedia interface (HDMI), a universal serial bus (USB), Institute of Electrical and Electronics Engineers (IEEE) 1394, and the like.

The near field communication module 161 may be configured to perform wireless short-distance communication with the electronic apparatus 100 and a peripheral device. The near field communication module 161 may include at least one of a Bluetooth module, an infrared data association (IrDA) module, a Near Field Communication module, a Wi-Fi module, a Zigbee module, etc.

The wireless communication module 162 may be a module that is connected to an external network and performs communication according to a wireless communication protocol such as IEEE. In addition, the wireless communication module may further include a mobile communication module for performing communication by accessing a mobile communication network according to various mobile communication standards such as 3rd Generation (3G), 3GPP (3rd Generation Partnership Project), LTE (Long Term Evolution), etc.

As described above, the communicator 160 may be embodied based on the various near field communication methods, and to the extent of necessary, other communication technologies could be employed.

The connector 163 may be configured to provide an interface with various source devices such as USB 2.0, USB 3.0, HDMI, and IEEE 1394. The connector 163 may receive contents data transmitted from an external server through a wired cable connected to the connector 163 according to a control command of the processor 130, or transmit the pre-stored contents data to an external recording medium. The connector 163 may receive power from a power source through a wired cable physically connected to the connector 163.

The audio output unit 170 may be configured to output audio data. The audio output unit 170 may output various alarming sounds or voice messages in addition to various audio data signal processed by an audio processor.

The storage 180 may lock information including iris codes respectively corresponding to the user's left eye and the right eye for unlocking the screen. The lock information may include user's fingerprint information, voice information, and pattern information, etc. in addition to the iris codes.

The storage 180 may further include operational programs for controlling the electronic apparatus 100.

The operational program may be read by the storage 180 and compiled when the electronic apparatus 100 is turned on to operate each constituent element of the electronic apparatus 100. The storage 180 may embodied as the ROM 131, the RAM 132, or a memory card (e.g., secure digital (SD) card, memory stick) removable from/attachable to the electronic apparatus 100, a nonvolatile memory, a volatile memory, a hard disk drive (HDD) or a solid state drive (SSD).

The processor 130 may control the operations of the electronic apparatus 100 overall, or may be a processing device for controlling the overall operations of the electronic apparatus 100.

The processor 130 may include a CPU 133, a ROM 131, a RAM 132 and a GPU 134. The CPU 133, the ROM 131, the RAM 132, the GPU 134 may be interconnected via a bus 135.

The CPU 133 may access the storage 180 and perform booting by using the O/S stored in the storage 180. The CPU 133 may perform various operations by using various programs, contents, data, etc. stored in the storage 180.

The graphics processor 134 may generate a screen including various objects such as icons, images, texts, etc. by using a calculation unit and a rendering unit. The graphics processor 134 may calculate attribute values such as coordinate values, shapes, sizes, colors, etc. of the objects according to the layout of the screen by using the received control command, and generate display screens in various layouts including objects based on the calculated attribute values.

A command set for system boning may be stored in the ROM 131. When a turn-on command is input and power is supplied, the CPU 133 may copy the O/S stored in the storage 180 to the RAM 134 according to the command stored in the ROM 131, execute the O/S and perform system booting. When the booting is completed, the CPU 133 may copy various application programs stored in the storage 180 to the RAM 132, execute the application programs copied to the RAM 132, and perform various operations.

The processor 130 may be implemented as a system-on-a-chip (SOC) or a system-on-chip (SoC) in combination with the above-described components.

As described above, the constituent elements of the electronic apparatus 100 have been described in detail. Hereinafter, the operation of recognizing user's irises in an electronic apparatus 100 according to an embodiment of the disclosure will be described in detail.

Figure 4:
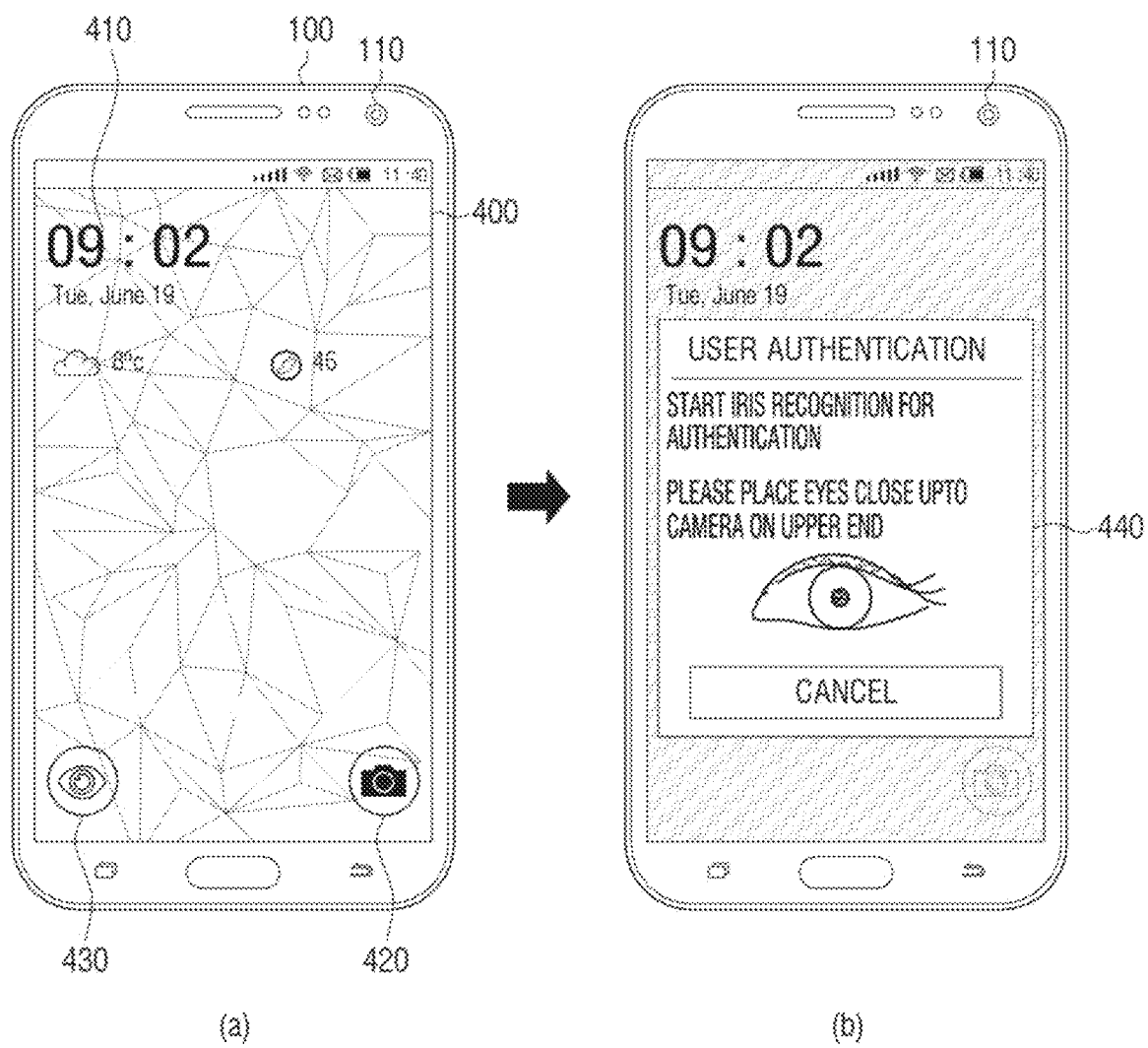
FIG. 4 is a first exemplary view illustrating recognition of a user's iris in an electronic apparatus according to an embodiment of the disclosure.

FIG. 4 is a first exemplary view illustrating recognition of a user's iris in an electronic apparatus according to an embodiment of the disclosure.

Referring to part (a) of FIG. 4, an electronic apparatus 100 may display a lock screen 400. The lock screen 400 may include a widget UI 410 for providing time and weather information set by a user, a capture UI 420 for capturing an image, and an iris recognition UI 430 for unlocking the electronic apparatus 100 through user's iris recognition.

When the iris recognition UI 430 is selected with the lock screen 400 being displayed, the electronic apparatus 100 may display a guide UI 440 for capturing user's iris as shown in part (b) of FIG. 4.

Therefore, a user may place user's left eye and the right eye onto the camera 110 positioned on the one upper side of the electronic apparatus 100 according to the explanation guided on the guide UI 440 displayed on a screen of the electronic apparatus 100.

Therefore, the electronic apparatus 100 may capture user's face including user's left eye and the right eye placed onto the camera 110, and obtain the iris images respectively corresponding to the left eye and the right eye in the captured user face image.

The electronic apparatus 100 may compare the obtained iris images respectively corresponding to the left eye and the right eye with the pre-registered iris images respectively corresponding to the left eye and the right eye to perform user's iris recognition.

As a result of the iris recognition, if the iris images obtained from the captured eye image match the pre-registered iris images, the electronic apparatus 100 may unlock the screen, and display an initial screen of the electronic apparatus 100. The unlocked initial screen may be a screen including a plurality of icons for respectively executing a plurality of applications stored in the electronic apparatus 100, or a displayed execution screen before switching to the lock screen 400.

Figure 5:
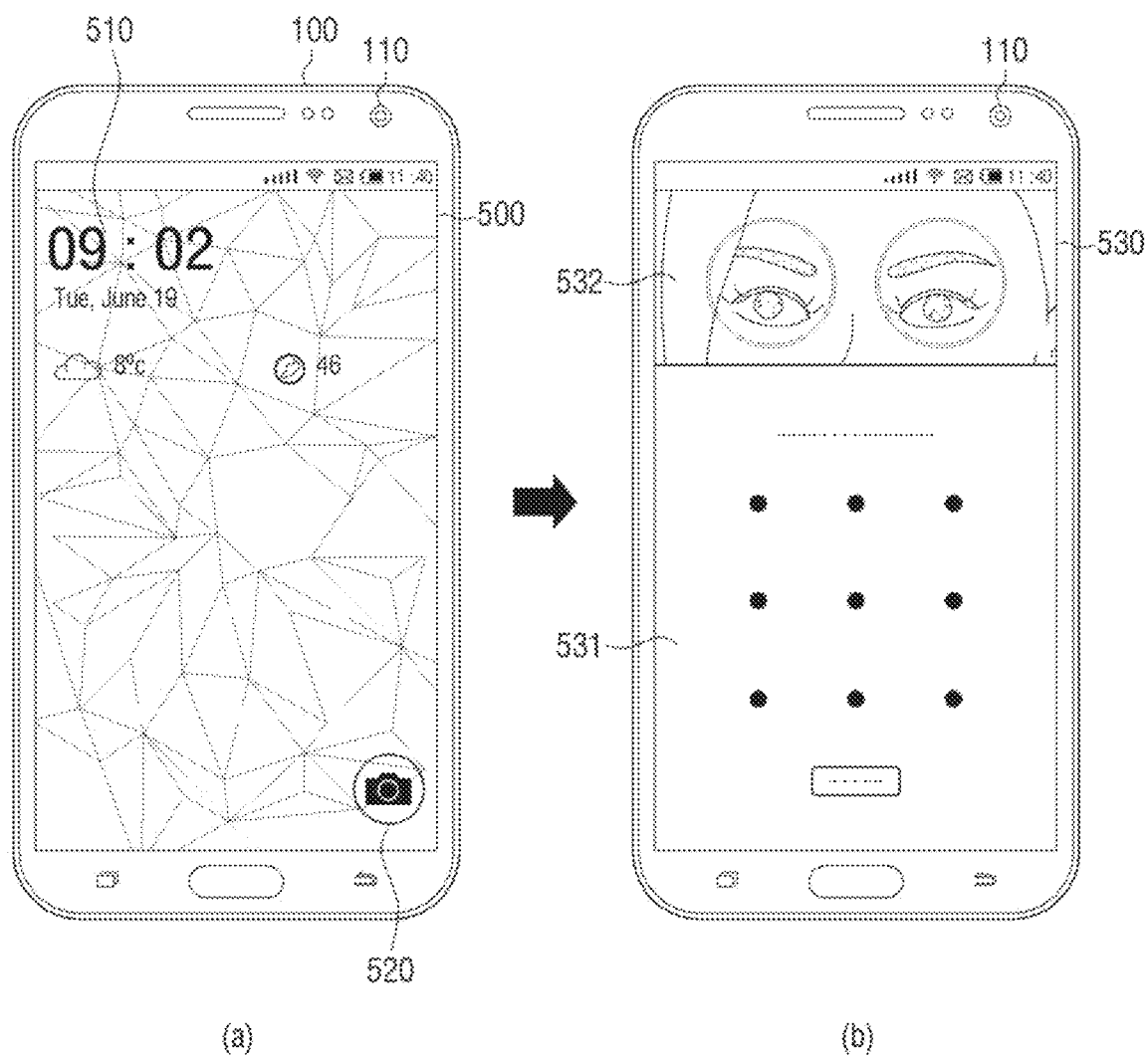
FIG. 5 is a second exemplary view illustrating recognition of a user's iris in an electronic apparatus according to another embodiment of the disclosure.

FIG. 5 is a second exemplary view illustrating recognition of a user's iris in an electronic apparatus according to another embodiment of the disclosure.

Referring to part (a) of FIG. 5, an electronic apparatus 100 may display a lock screen 500. The lock screen 500 may include a widget UI 510 for providing time and weather information set by a user, or a capture UI 520 for capturing an image.

While the lock screen 500 is displayed, the electronic apparatus 100 may display a user authentication screen 530 for releasing a lock screen according to a user command for touching the lock screen 500.

The user authentication screen 510 may include a pattern recognition UI 531 for performing user authentication through a pattern preset by a user, or an iris recognition UI 532 for recognizing the user's iris.

When user's touch is input through the pattern recognition UI 531 while the user authentication screen 530 is displayed, the electronic apparatus 100 may identify whether the input user touch matches the pre-set pattern. As a result of identification, if the user's touch matches the pre-set pattern, the electronic apparatus 100 may unlock the screen, and display the initial screen of the electronic apparatus 100. The unlocked initial screen may be a screen including a plurality of icons for respectively executing a plurality of applications stored in the electronic apparatus 100, or a displayed execution screen before switching to the lock screen 400.

The user may give a gaze to the camera 110 provided on the one upper side of the electronic apparatus 100. In this case, the electronic apparatus 100 may capture the user's face through the camera 110, and obtain the iris images respectively corresponding to the left eye and the right eye in the captured user face image.

The electronic apparatus 100 may compare the obtained iris images respectively corresponding to the left eye and the right eye with the pre-registered iris images respectively corresponding to the left eye and the right eye to perform user iris recognition.

As a result of the iris recognition, if the iris images obtained from the captured eye image match the pre-registered iris images, the electronic apparatus 100 may unlock the screen, and display an initial screen of the electronic apparatus 100. The unlocked initial screen may be a screen including a plurality of icons for respectively executing a plurality of applications stored in the electronic apparatus 100, or a displayed execution screen before switching to the lock screen 400.

As described above, the operation of unlocking the screen of the electronic apparatus 100 through user's iris recognition of the electronic apparatus 100 has been described. Hereinafter, the operation of the performing user authentication through the user iris image recognized by the electronic apparatus 100 will be described.

Figure 6:
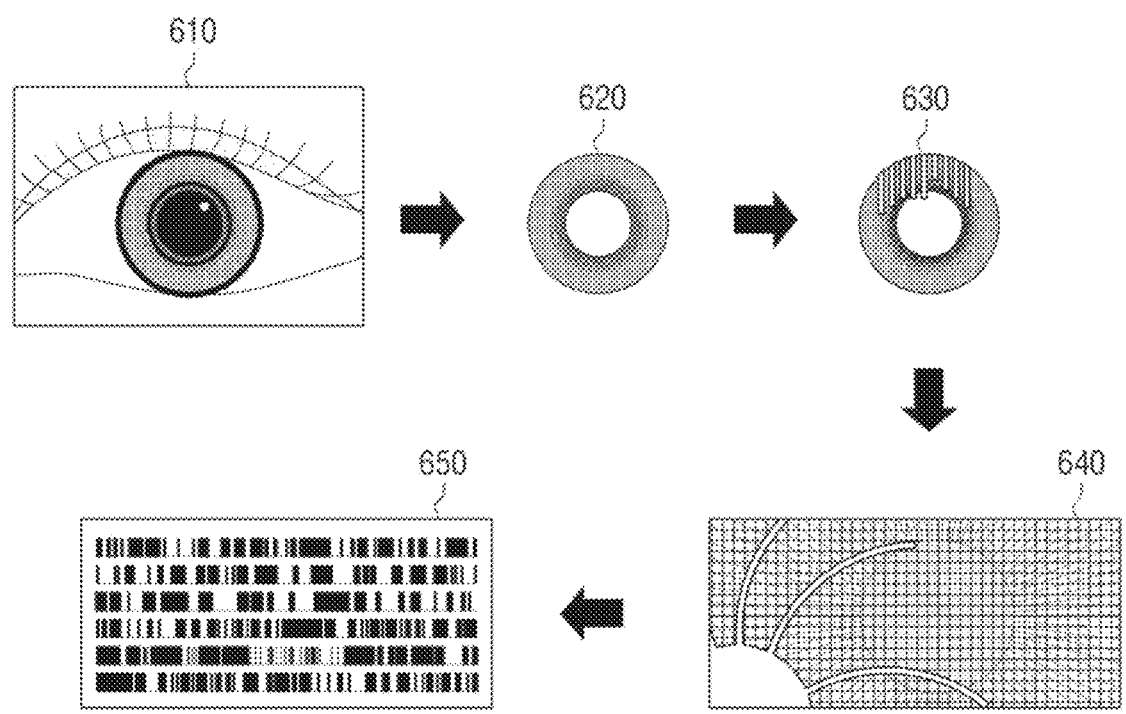
FIG. 6 is an exemplary view illustrating generation of an iris code for recognition of a user's iris from an iris image in an electronic apparatus according to an embodiment of the disclosure.

FIG. 6 is an exemplary view illustrating generation of an iris code for recognition of a user's iris from an iris image in an electronic apparatus according to an embodiment of the disclosure.

Referring to FIG. 6, an electronic apparatus 100 may obtain iris images respectively corresponding to the left eye and the right eye from the captured user face image.

The electronic apparatus 100 may detect a boundary of iris from the obtained iris images respectively corresponding to the left eye and the right eye at operation 610. According to an embodiment, the electronic apparatus 100 may detect the boundaries of the iris images respectively corresponding to the left eye and the right eye by using a circular boundary detector.

The electronic apparatus 100 may separate the iris areas from the iris images respectively corresponding to the left eye and the right eye through the detected iris boundaries at operation 620. The electronic apparatus 100 may remove unnecessary elements for iris recognition from the separated iris areas respectively corresponding to the left eye and the right eye by performing a noise elimination process at operation 630. The electronic apparatus 100 may transform the iris areas respectively corresponding to the left eye and the right eye, in which unnecessary elements are removed, into a polar coordinate system and normalize the transformed iris areas into a rectangular shape at operation 640. The electronic apparatus 100 may extract characteristics of patterns of the normalized iris areas respectively corresponding to the left eye and the right eye, and generate the iris codes of the iris images respectively corresponding to the left eye and the right eye based on the extracted characteristic information at operation 640.

A technique of detecting iris areas from the iris images respectively corresponding to the left eye and the right eye, eliminating noise of the detected iris areas, and then normalizing the noise-removed iris area to generate an iris code for the normalized iris area is a well-known technique in the art, and thus the detailed description thereof will be omitted.

When the iris codes for the iris images respectively corresponding to the left eye and the right eye are generated through the above described embodiment, the electronic apparatus 100 may compare the generated iris codes with the pre-registered iris codes, and if the two codes match each other, unlock the screen.

The electronic apparatus 100 may shift the pre-generated iris codes to one side considering at least one of the capture user tilted angle and the rotational angle of the electronic apparatus 100 before identifying whether the pre-generated iris codes match the pre-registered iris codes. The electronic apparatus 100 may compare the shifted iris code with the pre-registered iris code, and if the two codes match each other, unlock the screen.

The operation of obtaining the user tilted angle from the electronic apparatus 100 will be described in detail.

Figure 7:
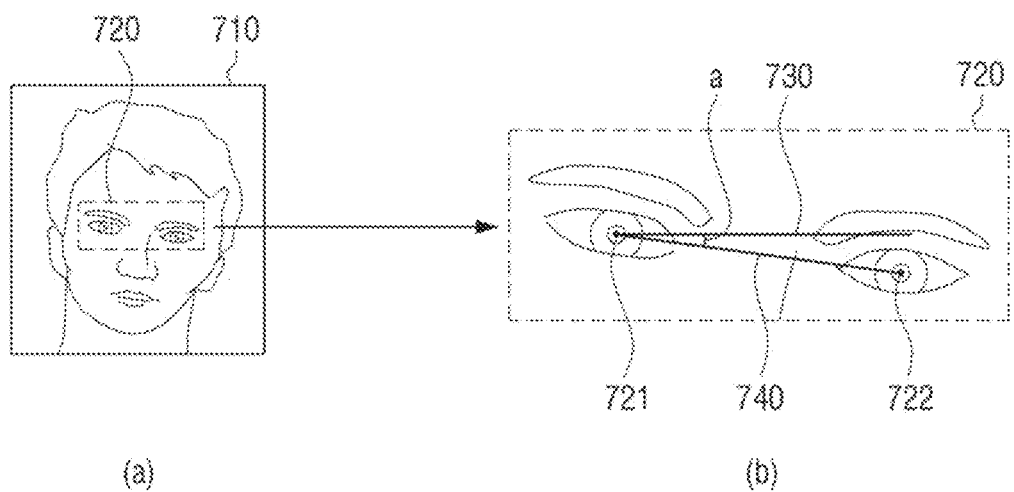
FIG. 7 is a first exemplary view of obtaining an angle of a user's face in an electronic apparatus according to an embodiment of the disclosure.

FIG. 7 is a first exemplary view of obtaining an angle of a user's face in an electronic apparatus according to an embodiment of the disclosure.

Referring to part (a) of FIG. 7, when a user face image 710 is captured, an electronic apparatus 100 may obtain iris images 720 respectively corresponding to the left eye and the right eye from the captured face image 710. The electronic apparatus 100 may obtain the user tilted angle from the degree of tilt between center points of the iris images 720 respectively corresponding to the obtained left eye and the right eye.

When the iris images 720 respectively corresponding to the left eye and the right eye are obtained, the electronic apparatus 100 may detect the iris areas from the iris images 720 respectively corresponding to the left eye and the right eye through the above-described embodiment. The electronic apparatus 100 may identify center points 721 and 722 from the iris areas respectively corresponding to the left eye and the right eye.

The electronic apparatus 100 may obtain an angle (a) between an extension line 730 and a connection line 740 as a user tilted angle by using the extension line 730 horizontally extended from the center point 721 of the iris area of one of the left eye and the right eye, and the connection line 740 connecting the center points 721 and 722 of the iris areas respectively corresponding to the left eye and the right eye.

Figure 8:
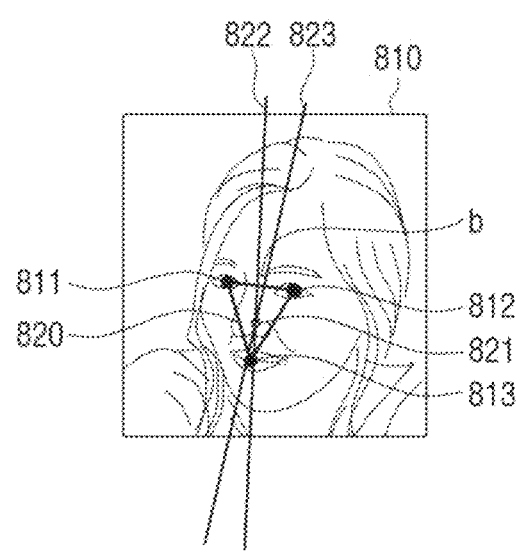
FIG. 8 is a second exemplary view of obtaining an angle of a user's face in an electronic apparatus according to another embodiment of the disclosure.

FIG. 8 is a second exemplary view of obtaining an angle of a user's face in an electronic apparatus according to another embodiment of the disclosure.

Referring to FIG. 8, when a user face image 810 is captured, the electronic apparatus 100 may obtain feature points of the face by analyzing the captured face image 810. The feature points of the face may be center points 811 and 812 of the iris areas respectively corresponding to the left eye and the right eye and a center point 813 of lower lip.

When the feature points of face 811 to 813 are obtained, the electronic apparatus 100 may obtain a polygon 820 in a triangle shape connecting the obtained feature points 811 to 813.

The electronic apparatus 100 may obtain an angle (b) between a reference line 822 and an extension line 823 based on the center point 821 of the obtained polygon 820 as a tilted angle.

The reference line 822 may be a line passing through the center point 821 of the polygon 820 in a vertical direction, and the extension line 823 may be a line connecting the center point 821 of the polygon 820 and the center point 813 of lower lip.

The electronic apparatus 100 may obtain an angle (b) of the center point 821 of the polygon 820 at which the reference line 822 intersects the extension line 823 as a tilted angle.

When a tilted angle is obtained through the above-described embodiment, the electronic apparatus 100 may shift the iris codes respectively corresponding to the left eye and the right eye of the image captured by using at least one of the obtained user tilted angle and the rotational angle of the electronic apparatus 100, compare the shifted iris code with the pre-registered iris code to perform user authentication.

Hereinafter, the operation of shifting the iris codes respectively corresponding to the left eye and the right eye of the image captured by at least one of the user tilted angle and the rotational angle of the electronic apparatus 100 will be described.

Figure 9:
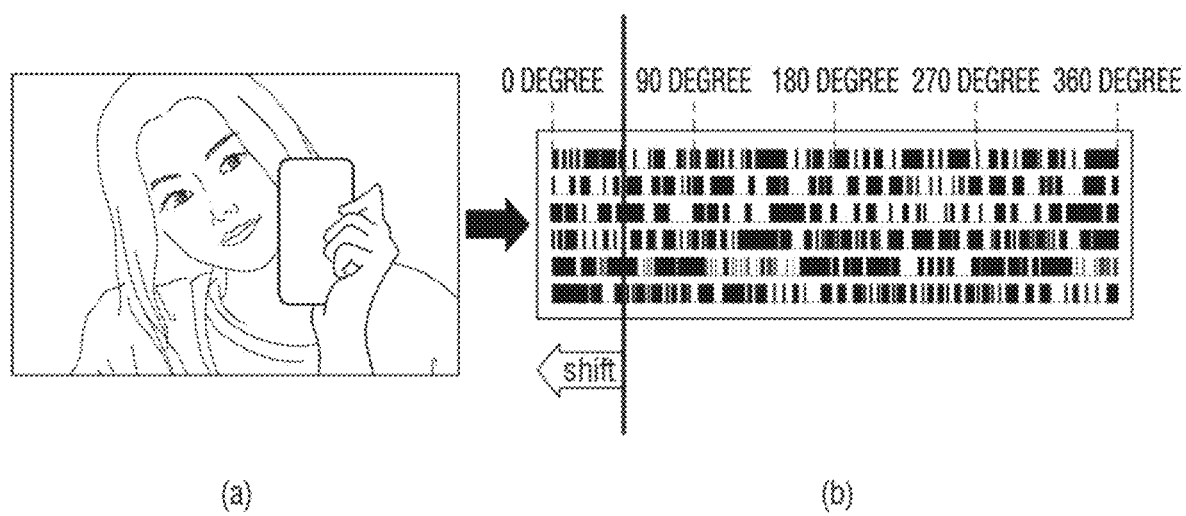
FIG. 9 is a first exemplary view of shifting an iris code by analyzing an image captured by an electronic apparatus according to an embodiment of the disclosure.

FIG. 9 is a first exemplary view of shifting an iris code by analyzing an image captured by an electronic apparatus according to an embodiment of the disclosure.

Referring part (a) of FIG. 9, a user may give a gaze to the camera 110 disposed on the one upper side of the electronic apparatus 100 to unlock the screen of the electronic apparatus 100. The user may give a gaze to the camera 110 of the electronic apparatus 100 with his/her face being inclined in one direction.

Therefore, the electronic apparatus 100 may capture the user face inclined in one direction through the camera 110 for user authentication.

When the user face image is captured, the electronic apparatus 100 may obtain a user tilted angle by analyzing the captured face image.

As described above, the electronic apparatus 100 may obtain the iris images respectively corresponding to the left eye and the right eye from the captured face image, and detect the iris areas respectively corresponding to the left eye and the right eye from the obtained iris images. The electronic apparatus 100 may obtain a user tilted angle depending on the degree of tilt of a connection lint between center points of the detected iris areas respectively corresponding to the left eye and the right eye.

In addition, as described above, the electronic apparatus 100 may obtain face feature points by analyzing the captured face image, and obtain a user tilted angle depending on the degree of tilt of the polygon in a triangle shape based on the obtained feature points.

The technical description for obtaining a user tilted angle has been described with references to FIGS. 7 and 8, and thus the detailed description thereof will be omitted.

When the user tilted angle is obtained, the electronic apparatus 100 may obtain a rotational angle of the electronic apparatus 100 based on the sensing information sensed by the sensor 120.

The electronic apparatus 100 may obtain a difference value between the user tilted angle and the rotational angle of the electronic apparatus 100.

As described above, the obtained user tilted angle may be 45 degrees, and the rotational degree of the electronic apparatus 100 may be 0 (zero) degree. The difference value between the user tilted angle and the rotational angle of the electronic apparatus 100 may be 45 degrees.

When the difference value between the user tilted angle and the rotational angle of the electronic apparatus 100 is identified, the electronic apparatus 100 may shift the iris codes for the iris areas obtained from the iris images respectively corresponding to the left eye and the right eye included in the user face image based on the identified difference value.

The technique for obtaining the iris codes from the iris images respectively corresponding to the left eye and the right eye in the user face image has been described in detail, and thus the detailed description thereof will be omitted.

As described above, the difference value between the user tilted angle and the rotational angle of the electronic apparatus 100 may be 45 degrees. The electronic apparatus 100 may shift the point corresponding to 45 degrees of the iris code to the start point (0 degree) as shown in part (b) of FIG. 9.

The electronic apparatus 100 may identify whether the iris codes respectively corresponding to the left eye and the right eye shifted by 45 degrees match the pre-registered iris codes respectively corresponding to the left eye and right eye. As a result of identification, when the iris codes shifted by 45 degrees match the pre-registered iris codes, the electronic apparatus 100 may identify the user is an authenticated user, and unlock the screen.

Figure 10:
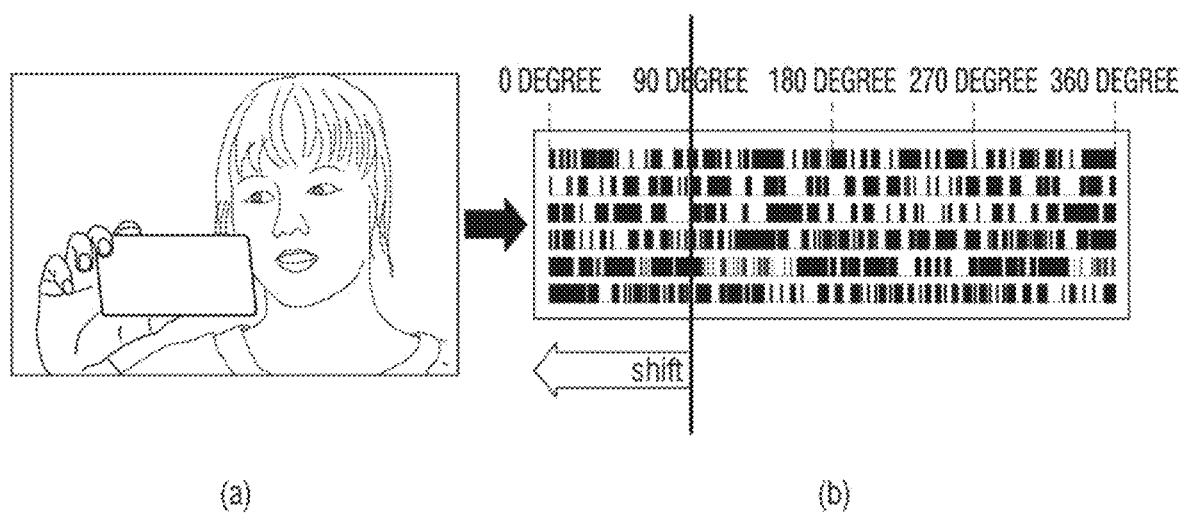
FIG. 10 is a second exemplary view of shifting an iris code by analyzing an image captured by an electronic apparatus according to another embodiment of the disclosure.

FIG. 10 is a second exemplary view of shifting an iris code by analyzing an image captured by an electronic apparatus according to another embodiment of the disclosure.

Referring to part (a) of FIG. 10, a user may give a gaze to the camera 110 provided on the front face of the electronic apparatus 100 to unlock the screen of the electronic apparatus 100. The electronic apparatus 100 may be rotated in a horizontal direction.

While the electronic apparatus 100 is rotated in a horizontal direction, the electronic apparatus 100 may capture a user face through the camera 110 for user authentication.

When the user face image is captured, the electronic apparatus 100 may obtain a user tilted angle by analyzing the captured face image.

As described above, the electronic apparatus 100 may obtain the iris images respectively corresponding to the left eye and the right eye from the captured face image, and detect the iris areas respectively corresponding to the left eye and the right eye from the obtained iris images. The electronic apparatus 100 may obtain a user tilted angle according to the degree of tilt of the connection between the center points of the detected iris areas respectively corresponding to the left eye and the right eye.

As described above, the electronic apparatus 100 may obtain face feature points by analyzing the captured face image, and obtain a user tilted angle according to the degree of tilt of a polygon in a triangle shape based on the obtained feature points.

The technical description for obtaining a user tilted angle has been described with reference to FIGS. 7 and 8. Therefore, the detailed description will be omitted.

When the face user angle is obtained, the electronic apparatus 100 may obtain a rotational angle of the electronic apparatus 100 based on the sensing information detected by the sensor 120.

The electronic apparatus 100 may obtain a difference value between the user tilted angle and the rotational angle of the electronic apparatus 100.

As described above, the obtained user tilted angle may be 0 degree, and the rotational degree of the electronic apparatus 100 may be 90 degrees. In this case, the difference value between the user tilted angle and the rotational angle of the electronic apparatus 100 may be 90 degrees.

When the difference value between the user tilted angle and the rotational angle of the electronic apparatus 100 is identified, the electronic apparatus 100 may shift the iris codes for the iris areas obtained from the iris images respectively corresponding to the left eye and the right eye in the user face image based on the identified difference value.

The technical description for obtaining the iris codes from the iris images respectively corresponding to the left eye and the right eye in the user face image has been described in detail, and thus the detailed description will be omitted.

As described above, the difference value between the user tilted angle and the rotational angle of the electronic apparatus 100 may be 90 degrees. Therefore, the electronic apparatus 100 may shift the point corresponding to 90 degrees of the iris code to the start point (0 degree) as shown in part (b) of FIG. 10.

The electronic apparatus 100 may identify whether the iris codes respectively corresponding to the left eye and the right eye shifted by 90 degrees match the pre-registered iris codes respectively corresponding to the left eye and the right eye. As a result of identification, when the iris codes shifted by 90 degrees match the pre-registered iris codes, the electronic apparatus 100 may identify the user as a correct user and unlock the screen.

Figure 11:
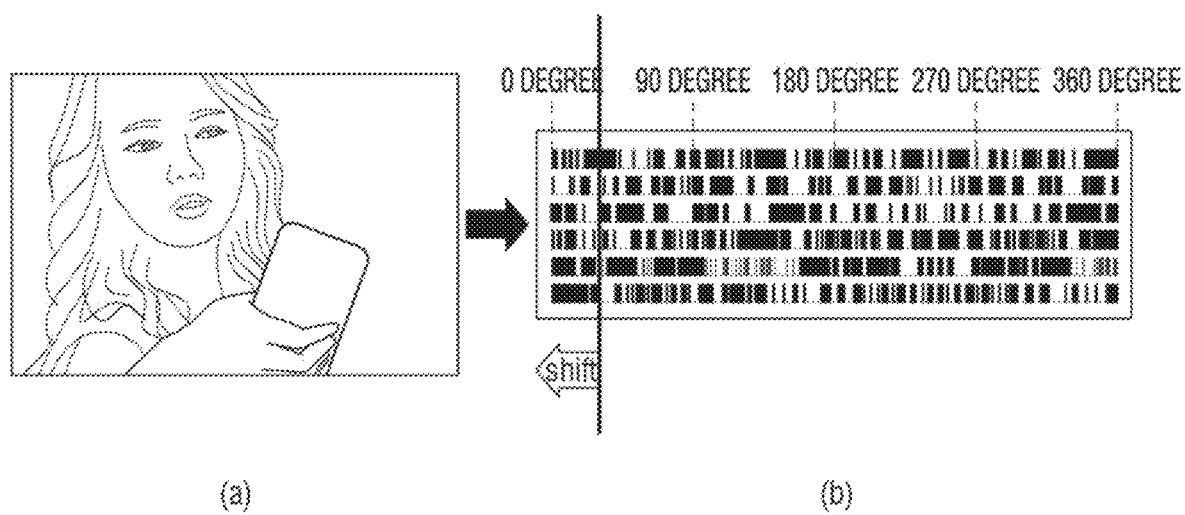
FIG. 11 is a third exemplary view of shifting an iris code by analyzing an image captured by an electronic apparatus according to another embodiment of the disclosure.

FIG. 11 is a third exemplary view of shifting an iris code by analyzing an image captured by an electronic apparatus according to another embodiment of the disclosure.

Referring to part (a) as shown in FIG. 11, a user may give a gaze to the camera 110 provided on the front surface of the electronic apparatus 100 in order to unlock the screen. The electronic apparatus 100 may be rotated in one direction. The user may give a gaze to the cameral 110 provided on the front face of the electronic apparatus 100 when the user face is rotated in a direction opposite to the electronic apparatus 100.

The electronic apparatus 100 may capture a user face through the camera 110 for user authentication when the electronic apparatus 100 and the user face are rotated.

When the user face image is captured, the electronic apparatus 100 may obtain a user tilted angle by analyzing the captured face image.

The electronic apparatus 100 may obtain the iris images respectively corresponding to the left eye and the right eye from the captured face image, and detect the iris areas respectively corresponding to the left eye and the right eye from the obtained iris images. The electronic apparatus 100 may obtain a user tilted angle according to the degree of tilt of the connection line between center points of the detected iris areas respectively corresponding to the left eye and the right eye.

The electronic apparatus 100 may obtain the feature points of the face by analyzing the captured face image, and obtain a user tilted angle according to the degree of tilt of a polygon in a triangle shape based on the obtained feature points.

The technical description of obtaining a user tilted angle has been described with reference to FIGS. 7 and 8 in detail, and thus the detailed description thereof will be omitted.

When the user tilted angle is obtained, the electronic apparatus 100 may obtain the rotational angle of the electronic apparatus 100 based on the sensing information sensed by the sensor 120.

The electronic apparatus 100 may obtain the difference value between the user tilted angle and the rotational angle of the electronic apparatus 100.

The obtained user tilted angle may be −10 degrees, and the rotational angle of the electronic apparatus 100 may be 20 degrees. In this case, the difference value between the user tilted angle between the rotational angle of the electronic apparatus 100 may be 30 degrees.

When the difference value between the user tilted angle and the rotational angle of the electronic apparatus is identified, the electronic apparatus 100 may shift the iris codes for the iris areas obtained from the iris images respectively corresponding to the left eye and the right eye in the user face image based on the identified difference value.

The technical description of obtaining the iris codes from the iris images respectively corresponding to the left eye and the right eye in the user face image has been described in detail, and thus the detailed description thereof will be omitted.

The difference value between the user tilted angle and the rotational angle of the electronic apparatus 100 may be 30 degrees. The electronic apparatus 100 may shift the point corresponding to 30 degrees of the iris code to the start point (0 degree) as shown in part (b) of FIG. 11.

The electronic apparatus 100 may identify whether the iris codes respectively corresponding to the left eye and the right eye shifted by 30 degrees match the pre-registered iris codes respectively corresponding to the left eye and the right eye. As a result of identification, when the iris codes shifted by 30 degrees match the pre-registered iris codes, the electronic apparatus 100 may identify the user as a correct user and unlock the screen.

The operations of shifting the iris codes respectively corresponding to the left eye and the right eye obtained from the face image captured based on the user tilted angle of the electronic apparatus 100 and the rotational angle of the electronic apparatus 100 and comparing the shifted iris codes with the pre-registered iris codes to perform user authentication have been described in detail.

Hereinafter, the operation for identifying an output mode of a display screen according to the user face angel of the electronic apparatus 100 in which the lock screen is released and the rotational angle of the electronic apparatus 100 will be described in detail.

Figure 12:
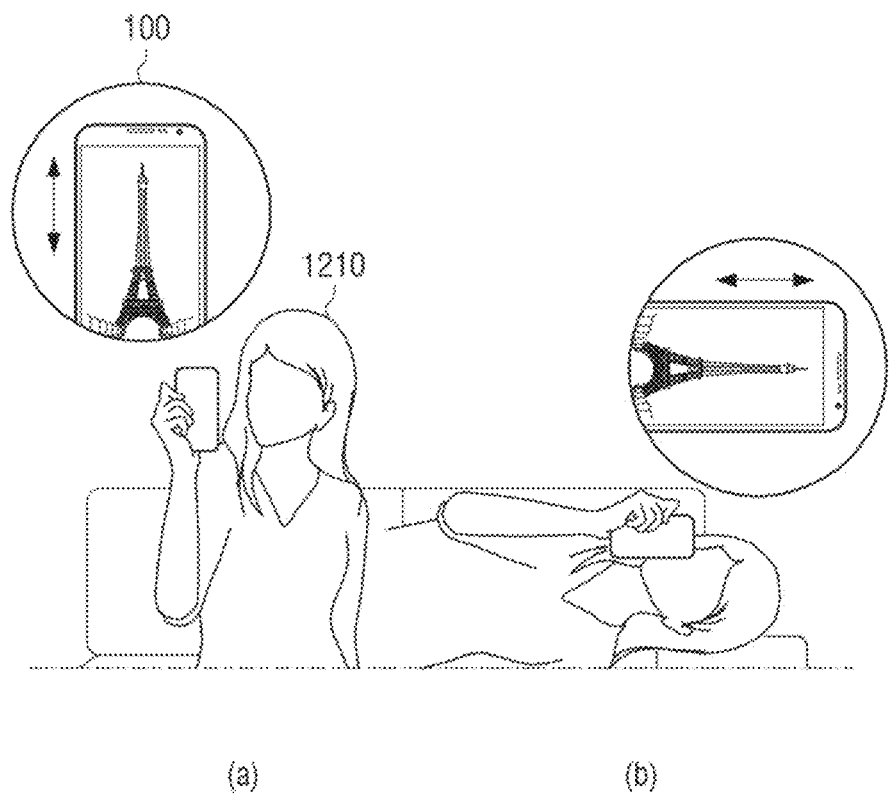
FIG. 12 is an exemplary view of displaying contents in an output mode identified according to a user tilted angle and a rotational angle of an electronic apparatus according to an embodiment of the disclosure.

FIG. 12 is an exemplary view of displaying contents in an output mode identified according to a user tilted angle and a rotational angle of an electronic apparatus according to an embodiment of the disclosure.

Referring to part (a) of FIG. 12, a user 1210 may display contents with holding an electronic apparatus 100 in a vertical direction.

While displaying contents, the electronic apparatus 100 may periodically identify whether the electronic apparatus 100 is rotated at a predetermined threshold angle or more based on sensing information detected by the sensor 120.

As a result of identification, if it is determined that the electronic apparatus 100 rotates at a predetermined threshold angle or more, according to a predetermined operation mode, the electronic apparatus 100 may identify an output ode of a display screen for displaying contents.

The operation mode of the electronic apparatus 100 may be set for identifying the output mode of the display screen for displaying contents based on the tilted angle and the rotational angle.

The electronic apparatus 100 may identify an output mode of the display screen for displaying contents based on the rotational angle of the electronic apparatus 100 and the user tilted angle.

For example, a user viewing contents displayed on the electronic apparatus 100 while holding the electronic apparatus 100 in a vertical direction may view the contents lying on a sofa as shown in part (b) of FIG. 12.

When such event occurs, the electronic apparatus 100 may identify that the electronic apparatus 100 rotates at a predetermined threshold angle or more.

In other words, according to the above-described event, the electronic apparatus 100 may rotate from the vertical direction to the horizontal direction. If it is determined that the electronic apparatus 100 is rotated at a predetermined threshold angle or more, the electronic apparatus 100 may capture a user face through the camera 110 disposed on the upper front end of the screen for displaying contents.

The electronic apparatus 100 may obtain a user tilted angle by analyzing the user face image captured through the above-described embodiment. The electronic apparatus 100 may identify whether the difference value between the obtained user tilted angle and the rotational angle of the electronic apparatus 100 is smaller than a predetermined threshold value.

As a result of identification, if it is determined that the difference value between the user tilted angle and the rotational angle of the electronic apparatus 100 is smaller than a predetermined threshold value, the electronic apparatus 100 may output contents while maintaining the output mode for outputting contents in a vertical direction.

However, the disclosure is not limited thereto, but the electronic apparatus 100 may identify whether the difference value between the obtained user tilted angle and the rotational angle of the electronic apparatus 100 is equal to or smaller than a predetermined threshold value.

When the difference value between the user tilted angle and the rotational angle of the electronic apparatus 100 is equal to or smaller than the predetermined threshold value, the electronic apparatus 100 may output contents while maintaining the output mode for outputting the contents in a vertical direction.

When the difference value between the user tilted angle and the rotational angle of the electronic apparatus 100 is equal to or greater than the predetermined threshold value, the electronic apparatus 100 may output contents by switching to a different mode from the output mode for outputting contents in a vertical direction.

However, the disclosure is not limited thereto, but the electronic apparatus 100 may identify whether the difference value between the obtained user tilted angle between the rotational angle of the electronic apparatus 100 exceeds a predetermined threshold value.

When the difference value between the user tilted angle and the rotational angle of the electronic apparatus 100 exceeds the predetermined threshold value, the electronic apparatus 100 may output contents by switching to a different mode from the output mode for outputting contents in a vertical direction.

The operation mode of the electronic apparatus 100 may be set for identifying the output mode of the display screen for displaying contents based on the rotational angle of the electronic apparatus 100.

The electronic apparatus 100 may identify the output mode of the display screen for displaying the contents based on the rotational angle of the electronic apparatus 100.

As described above, a user viewing contents displayed on the electronic apparatus 100 with holding the electronic apparatus 100 in a vertical direction may view the contents lying on a sofa as shown in part (b) of FIG. 12.

When such event occurs, the electronic apparatus 100 may identify that the electronic apparatus 100 rotates at a predetermined threshold angle or more.

According to the above-described event, the electronic apparatus 100 may rotate from a vertical direction to a horizontal direction. If it is determined that the electronic apparatus 100 is rotated at a predetermined threshold angle or more, the electronic apparatus 100 may switch to a different output mode from the output mode for displaying the contents.

The configurations and the operations of the electronic apparatus 100 have been described in detail. Hereinafter, a method for controlling the electronic apparatus 100 will be described in detail.

Figure 13:
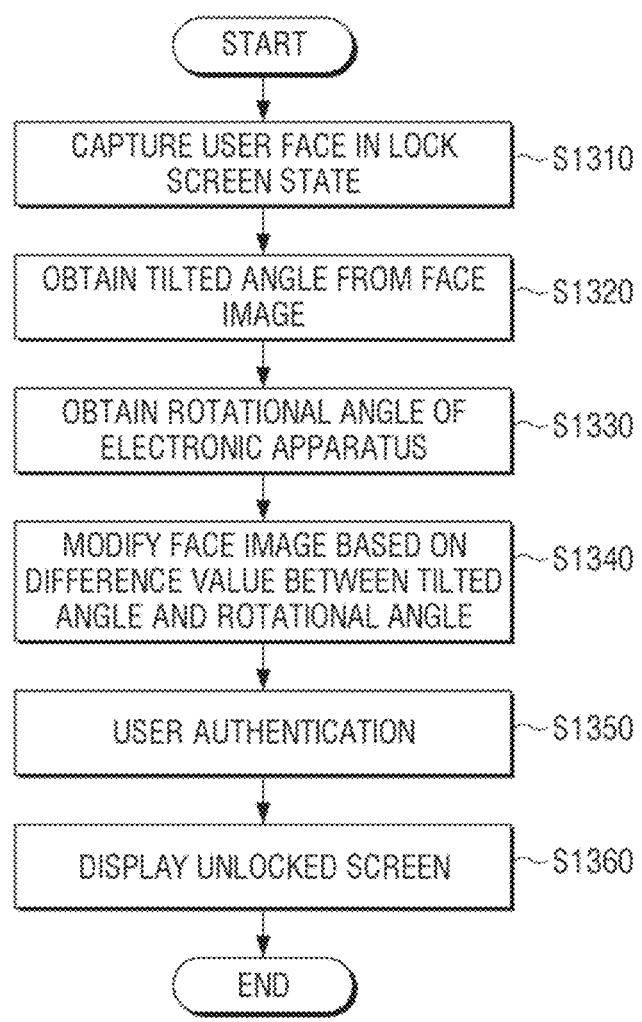
FIG. 13 is a flowchart of a method for controlling an electronic apparatus according to an embodiment of the disclosure.

FIG. 13 is a flowchart to explain a method for controlling an electronic apparatus according to an embodiment of the disclosure.

Referring to FIG. 13, an electronic apparatus 100 may capture a user face in a lock screen state at step S1310. The electronic apparatus 100 may obtain a tilted angle by analyzing the captured face image at step S1320.

According to an embodiment, the electronic apparatus 100 may obtain a tilted angle depending on the degree of tilt between center points of iris images respectively corresponding to the left eye and the right eye in the captured face image.

According to another embodiment, the electronic apparatus 100 may obtain feature points of a face by analyzing the captured face image. The electronic apparatus 100 may obtain a tilted angle depending on the degree of tilt of a polygon obtained based on the feature points.

When the user tilted angle is obtained through the various embodiments, the electronic apparatus 100 may obtain the rotational angle of the electronic apparatus 100.

Specifically, the electronic apparatus 100 may obtain the rotation angle of the electronic apparatus 100 by using the sensing value acquired through at least one of the acceleration sensor, the geomagnetic sensor, and the gyro sensor included in the electronic apparatus 100.

When the tilted angle and the rotational angle of the electronic apparatus 100 are obtained, the electronic apparatus 100 may modify the face image captured based on the difference value between the obtained tilted angle and the rotational angle of the electronic apparatus 100 at step S1330.

The electronic apparatus 100 may perform user authentication based on the modified face image, and when the user authentication is completed, the electronic apparatus 100 may display an unlock screen at steps S1340, S1350, and S1360.

Hereinafter, a method for modifying a face image in the electronic apparatus 100 will be described in detail.

Figure 14:
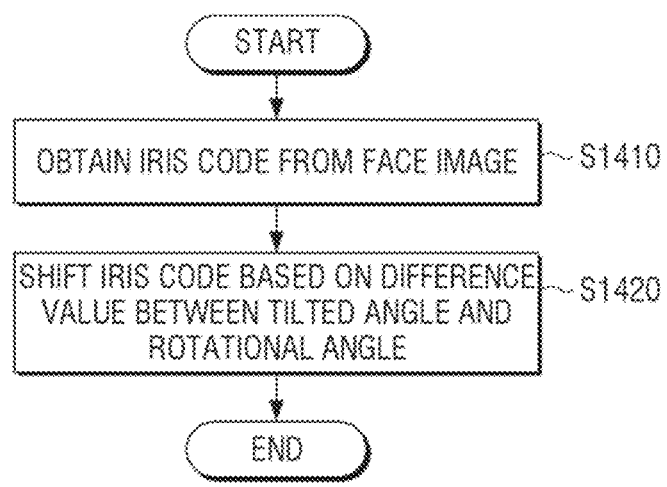
FIG. 14 is a flowchart of a method for modifying a face image captured by an electronic apparatus according to an embodiment of the disclosure.

FIG. 14 is a flowchart to explain a method for modifying a face image captured by an electronic apparatus according to an embodiment of the disclosure.

Referring to FIG. 14, when a user face image is captured, the electronic apparatus 100 may obtain iris codes respectively corresponding to the left eye and the right eye from the captured face image at step S1410.

The electronic apparatus 100 may shift the obtained iris codes respectively corresponding to the left eye and the right eye based on the difference value between the obtained tilted angle and the rotational angle of the electronic apparatus 100 at step S1420.

Therefore, the electronic apparatus 100 may perform user authentication by identifying whether the shifted iris codes respectively corresponding to the left eye and the right eye match the pre-registered iris codes respectively corresponding to the left eye and the right eye The electronic apparatus 100 may identify whether the difference value between the obtained tilted angle and the rotational angle of the electronic apparatus 100 exceeds a pre-determined threshold value before identifying whether the shifted iris codes respectively corresponding to the left eye and the right eye match the pre-registered iris codes respectively corresponding to the left eye and the right eye.

As a result of identification, if the difference value between the obtained tilted angle and the rotational angle of the electronic apparatus 100 is equal to or smaller than the predetermined threshold value, the electronic apparatus 100 may perform user authentication based on the above described method.

If the difference value between the obtained tilted angle of the rotational angle of the electronic apparatus 100 exceeds the predetermined threshold value, the electronic apparatus 100 may shift one of the iris codes respectively corresponding to the left eye and the right eye in the captured face image based on the difference value between the obtained tilted angle and the rotational angle of the electronic apparatus 100.

The electronic apparatus 100 may perform user authentication based on the shifted one iris code and the pre-registered iris code.

For example, when the difference value between the obtained tilted angle of the rotational angle of the electronic apparatus 100 exceeds the predetermined threshold value, the electronic apparatus 100 may shift the iris code of the left eye based on the difference value. The electronic apparatus 100 may compare the shifted left eye's iris code with the pre-registered left eye' iris code and perform user authentication based on whether the two iris codes match each other.

As described above, when user authentication is completed, the electronic apparatus 100 may identify an output mode of a display screen based on at least one of the obtained tilted angle and the rotational angle of the electronic apparatus 100 according to the operation mode set by a user, and display a screen in the identified output mode.

Hereinafter, a method for identifying an output mode of a display screen according to the operation mode set by a user in the electronic apparatus 100 will be described in detail.

Figure 15:
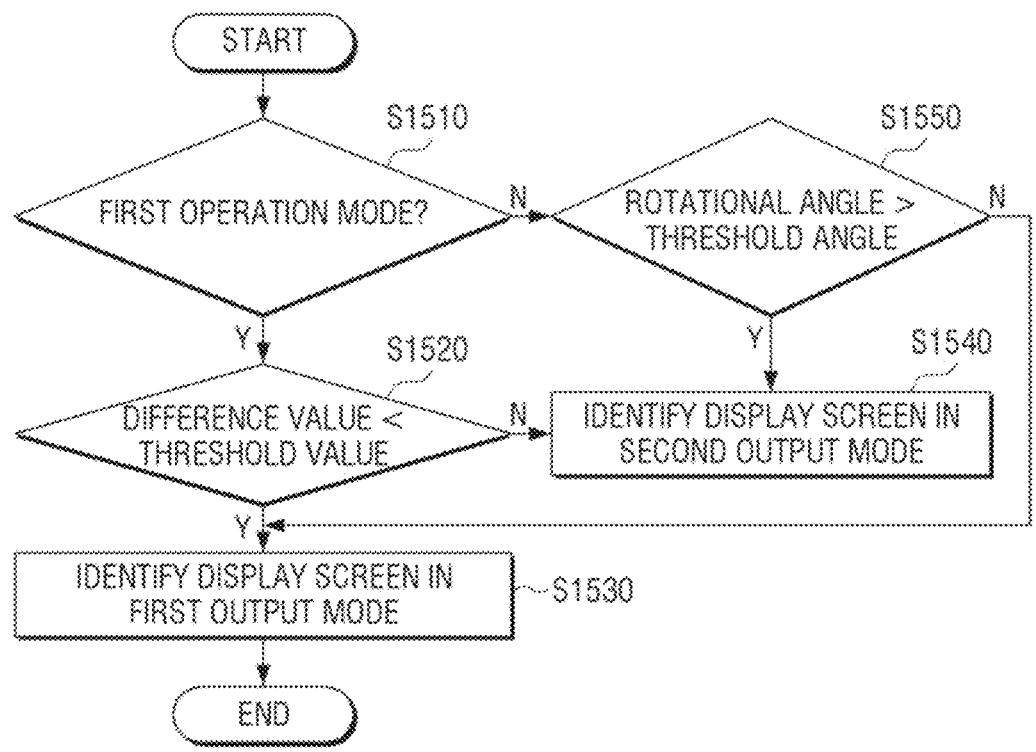
FIG. 15 is a flowchart of a method for identifying an output mode of a display screen according to an operation mode in an electronic apparatus according to an embodiment of the disclosure.

FIG. 15 is a flowchart to explain a method for identifying an output mode of a display screen according to an operation mode in an electronic apparatus according to an embodiment of the disclosure.

Referring to FIG. 15, an electronic apparatus 100 may identify whether the operation mode set by a user is a first operation mode at step S1510.

The first operation mode may be an operation mode for identifying an output mode of a display screen based on a tilted angle and a rotational angle of the electronic apparatus 100.

As a result of identification, in the first operation mode, the electronic apparatus 100 may identify whether the difference value between the obtained tilted angle and the rotational angle of the electronic apparatus 100 is smaller than a pre-determined threshold value at step S1520.

As a result of identification, if the difference value between the obtained tilted angle and the rotational angle of the electronic apparatus 100 is smaller than a pre-determined threshold value, the electronic apparatus 100 may identify an output mode of a display screen as a first output mode at step S1530.

If the difference value between the obtained tilted angle and the rotational angle of the electronic apparatus 100 is greater than a pre-determined threshold value, the electronic apparatus 100 may identify an output mode of a display screen as a second output mode at step S1540.

The first output mode may be an output mode in which the electronic apparatus 100 outputs an image in a vertical direction, and the second output mode may be an output mode for outputting an image in a horizontal direction.

The electronic apparatus 100 may identify the output mode of the display screen as the second output mode depending whether the following conditions are more satisfied at step S1540.

If the difference value between the obtained tilted angle and the rotational angle of the electronic apparatus 100 is greater than a pre-determined threshold value, the electronic apparatus 100 may identify whether the rotational angle of the electronic apparatus 100 exceeds a pre-determined threshold angle.

As a result of identification, if the rotational angle of the electronic apparatus 100 exceeds a pre-determined threshold angle, and the difference value between the obtained tilted angle and the rotational angle of the electronic apparatus 100 is greater than a pre-determined threshold value, the electronic apparatus 100 may identify the output mode of the display screen as the second output mode.

If the difference value between the obtained tilted angle and the rotational angle of the electronic apparatus 100 is greater than a pre-determined threshold value, the electronic apparatus 100 may identify whether the rotational angle of the electronic apparatus 100 is equal to or smaller than a pre-determined threshold angle.

As a result of identification, if the rotational angle of the electronic apparatus 100 exceeds a pre-determined threshold angle, and the difference value between the obtained tilted angle and the rotational angle of the electronic apparatus 100 is equal to or smaller than a pre-determined threshold value, the electronic apparatus 100 may identify the output mode of the display screen as the second output mode.

If it is determined that the operation mode of the electronic apparatus 100 is the second operation mode, not the first operation mode at step S1510, the electronic apparatus 100 may identify whether the rotational angle of the electronic apparatus 100 exceeds a pre-determined threshold angle at step S1550.

As a result of identification, if it is determined that the rotational angle of the electronic apparatus 100 is equal or smaller than a pre-determined threshold angle, the electronic apparatus 100 may identify an output mode of a display screen as the first output mode through step S1530.

If it is determined that the rotational angle of the electronic apparatus 100 exceeds the pre-determined threshold angle, the electronic apparatus 100 may identify the output mode of the display screen as the second output mode at step S1540.

As described above, a controlling method for the electronic apparatus 100 may be executed as at least one execution program, and such execution program may be stored in a non-transitory computer readable medium.

A non-transitory readable medium may be a medium that semi-permanently stores data and is readable by a device, not a medium a medium that stores data for a short period of time such as a register, a cache, a memory, etc. Specifically, the above-described program may be stored in a computer-readable recording medium such as a random-access memory (RAM), a flash memory, a read-only memory (ROM), an erasable programmable ROM (EPROM), an electronically erasable and programmable ROM (EEPROM), a register, a hard disk, a removable disk, a memory card, a universal serial bus (USB) memory, a CD-ROM, or the like.

The disclosure has been described above with reference to preferred embodiments thereof.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:

1. A method of authenticating a user of an electronic apparatus, the method comprising:
   capturing a face image of the user;
   obtaining a tilted angle of a face of the user, based on analysis of the captured face image with respect to a horizontal axis and a vertical axis;
   obtaining a rotational angle of the electronic apparatus with respect to the horizontal axis and the vertical axis;
   obtaining an iris code from the captured face image;
   determining a difference value between the obtained tilted angle and the obtained rotational angle;
   shifting the obtained iris code by shifting a point corresponding the determined difference value of the iris code to a start point of the iris code;
   comparing the shifted iris code with a pre-registered iris code; and
   authenticating the user, based on a result of the shifted iris code compared with the pre-registered iris code,
   wherein the obtaining of the tilted angle comprises obtaining the tilted angle based on a degree of tilt between a first line extending between center points of iris images respectively corresponding to a left eye and a right eye in the face image, and a second line extending in a horizontal direction of the face image.

2. The method as claimed in claim 1, wherein the obtaining of the tilted angle comprises:
   obtaining feature points of the face, based on the captured face image; and
   obtaining the tilted angle based on a degree of tilt of a polygon that is acquired from the obtained feature points.

3. The method as claimed in claim 1, wherein the obtaining of the rotational angle of the electronic apparatus comprises obtaining the rotational angle of the electronic apparatus, based on a sensing value that is acquired through any one or any combination of an acceleration sensor, a geomagnetic sensor and a gyro sensor that is included in the electronic apparatus.

4. The method as claimed in claim 1, further comprising identifying an output mode of a display screen, based on either one or both of the tilted angle and the rotational angle in accordance with an operation mode that is set by the user, based on the user being authenticated.

5. The method as claimed in claim 4, wherein the identifying comprises:
   based on the operation mode being a mode for identifying the output mode of the display screen based on the tilted angle and the rotational angle, and the difference value between the tilted angle and the rotational angle being smaller than a pre-determined threshold value, identifying the output mode of the display screen as a first output mode for outputting contents in a first direction; and
   based on the rotational angle exceeding a pre-determined threshold angle, and the difference value between the tilted angle and the rotational angle being equal to or greater than the pre-determined threshold value, identifying the output mode of the display screen as a second output mode for outputting contents in a second direction.

6. The method as claimed in claim 5, wherein the identifying comprises, based on the rotational angle being equal to or smaller than the pre-determined threshold angle, and the difference value between the tilted angle and the rotational angle being equal to or greater than the pre-determined threshold value, identifying the output mode of the display screen as the second output mode.

7. The method as claimed in claim 4, wherein the identifying comprises:
   based on the operation mode being a mode for identifying the output mode of the display screen based on the rotational angle, and the rotational angle being equal to or smaller than a pre-determined threshold angle, identifying the output mode of the display screen as a first output mode for outputting contents in a first direction; and
   based on the rotational angle exceeding the pre-determined threshold angle, identifying the output mode of the display screen as a second output mode for outputting contents in a second direction.

8. An electronic apparatus, comprising:
   a camera configured to capture a face image of a user;
   a sensor configured to detect a rotational angle of the electronic apparatus; and
   a processor configured to:
      obtain a tilted angle of a face of the user of the electronic apparatus, based on analysis of the face image captured by the camera;
      obtain the rotational angle detected by the sensor;
      obtain an iris code from the captured face image;
      determine a difference value between the obtained tilted angle and the obtained rotational angle;
      shift the obtained iris code by shifting a point corresponding the determined difference value of the iris code to a start point of the iris code;
      compare the shifted iris code with a pre-registered iris code; and
      authenticate the user, based on a result of the shifted iris code compared with the pre-registered iris code,
      wherein the processor is further configured to obtain the tilted angle based on a degree of tilt between a first line extending between center points of iris images respectively corresponding to a left eye and a right eye in the face image, and a second line extending in a horizontal direction of the face image.

9. The electronic apparatus as claimed in claim 8, wherein the processor is further configured to:
   obtains feature points of the face, based on the captured face image; and
   obtains the tilted angle based on a degree of tilt of a polygon that is acquired from the obtained feature points.

10. The electronic apparatus as claimed in claim 8, wherein the sensor comprises any one or any combination of an acceleration sensor, a geomagnetic sensor, and a gyro sensor, and
   wherein the processor is further configured to obtain the rotational angle of the electronic apparatus, based on a sensing value that is acquired through the any one or any combination of the acceleration sensor, the geomagnetic sensor and the gyro sensor.

11. The electronic apparatus as claimed in claim 8, further comprising: a display,
   wherein the processor is further configured to, based on the user being authenticated, identify an output mode of the display, based on either one or both of the tilted angle and the rotational angle in accordance with an operation mode that is set by the user.

12. The electronic apparatus as claimed in claim 11, wherein the processor is further configured to:
   based on the operation mode being a mode for identifying the output mode of the display based on the tilted angle and the rotational angle, and the difference value between the tilted angle and the rotational angle being smaller than a pre-determined threshold value, identify the output mode of the display as a first output mode for outputting contents in a first direction; and
   based on the rotational angle exceeding a pre-determined threshold angle, and the difference value between the tilted angle and the rotational angle being equal to or greater than the pre-determined threshold value, identify the output mode of the display as a second output mode for outputting contents in a second direction.

13. The electronic apparatus as claimed in claim 12, wherein the processor is further configured to, based on the rotational angle being equal to or smaller than the pre-determined threshold angle, and the difference value between the tilted angle and the rotational angle being equal to or greater than the pre-determined threshold value, identify the output mode of the display as the second output mode.

14. The electronic apparatus as claimed in claim 11, wherein the processor is further configured to:
   based on the operation mode being a mode for identifying the output mode of the display based on the rotational angle, and the rotational angle being equal to or smaller than a pre-determined threshold angle, identify the output mode of the display as a first output mode for outputting contents in a first direction; and
   based on the rotational angle exceeding the pre-determined threshold angle, identify the output mode of the display as a second output mode for outputting contents in a second direction.

* * * * *